United States Patent
Hu et al.

(10) Patent No.: US 10,133,936 B2
(45) Date of Patent: Nov. 20, 2018

(54) ACTIVE COMPRESSIVE SENSING VIA A THERMAL SENSOR FOR HUMAN SCENARIO RECOGNITION

(71) Applicant: The Board of Trustees of the University of Alabama, Tuscaloosa, AL (US)

(72) Inventors: Fei Hu, Tuscaloosa, AL (US); Rui Ma, Tuscaloosa, AL (US); Qi Hao, Guangdong (CN)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 0 days.

(21) Appl. No.: 15/621,404

(22) Filed: Jun. 13, 2017

(65) Prior Publication Data

US 2017/0357856 A1  Dec. 14, 2017

Related U.S. Application Data

(60) Provisional application No. 62/349,159, filed on Jun. 13, 2016.

(51) Int. Cl.
*G06K 9/00* (2006.01)
*G01J 5/00* (2006.01)

(52) U.S. Cl.
CPC ........ *G06K 9/00771* (2013.01); *G01J 5/0025* (2013.01); *G06K 9/00369* (2013.01); *G06K 9/00671* (2013.01); *G06K 9/00691* (2013.01); *G01J 2005/0077* (2013.01)

(58) Field of Classification Search
CPC ............... C06K 9/00771; G01J 5/0025; G06K 9/00369
See application file for complete search history.

(56) References Cited

U.S. PATENT DOCUMENTS

| | | | | |
|---|---|---|---|---|
| 2014/0027616 | A1* | 1/2014 | Twede | H04N 5/378 250/208.1 |
| 2017/0108330 | A1* | 4/2017 | Johnson | G01B 11/002 |
| 2017/0242102 | A1* | 8/2017 | Dussan | G01S 7/4816 |
| 2017/0322327 | A1* | 11/2017 | Boardman | G01T 1/295 |

OTHER PUBLICATIONS

N.M. Oliver, B. Rosario, A.P. Pentland, "A Bayesian computer vision system for modeling human interactions," in IEEE Transactions on Pattern Analysis and Machine Intelligence, vol. 22, No. 8, pp. 831-843, Aug. 2000.

O. Brdiczka, M. Langet, J. Maisonnasse, J.L. Crowley, "Detecting Human Behavior Models From Multimodal Observation in a Smart Home," in IEEE Transactions on Automation Science and Engineering, vol. 6, No. 4, pp. 588-597, Oct. 2009.

N.C. Tang, Y. Lin, M. Weng, H.Y.M. Liao, "Cross-Camera Knowledge Transfer for Multiview People Counting," in IEEE Transactions on Image Processing, vol. 24, No. 1, pp. 80-93, Jan. 2015.

(Continued)

*Primary Examiner* — Hugh H Maupin
(74) *Attorney, Agent, or Firm* — Meunier Carlin & Curfman LLC

(57) ABSTRACT

Disclosed and described herein is a system and a method for thermal detection of static and moving objects.

26 Claims, 17 Drawing Sheets

(56) References Cited

OTHER PUBLICATIONS

Y. Hou, G.K.H. Pang, "People Counting and Human Detection in a Challenging Situation," in IEEE Transactions on Systems, Man and Cybernetics, Part A: Systems and Humans, vol. 41, No. 1, pp. 24-33, Jan. 2011.

D.O. Olguin, B.N. Waber, T. Kim, A. Mohan, K. Ara, A. Pentland, "Sensible Organizations: Technology and Methodology for Automatically Measuring Organizational Behavior," in IEEE Transactions on Systems, Man, and Cybernetics, Part B: Cybernetics, vol. 39, No. 1, pp. 43-55, Feb. 2009.

J. Baek, B. Yun, "Posture Monitoring System for Context Awareness in Mobile Computing," in IEEE Transactions on Instrumentation and Measurement, vol. 59, No. 6, pp. 1589-1599, Jun. 2010.

G. Hache, E.D. Lemaire, N. Baddour, "Wearable Mobility Monitoring Using a Multimedia Smartphone Platform," in IEEE Transactions on Instrumentation and Measurement, vol. 60, No. 9, pp. 3153-3161, Sep. 2011.

M. Elhoushi, J. Georgy, A. Noureldin, M.J. Korenberg, "Motion Mode Recognition for Indoor Pedestrian Navigation Using Portable Devices," in IEEE Transactions on Instrumentation and Measurement, vol. 65, No. 1, pp. 208-221, Jan. 2016.

F. Wahl, M. Milenkovic, O. Amft, "A Distributed PIR-based Approach for Estimating People Count in Office Environments," in 2012 IEEE 15$^{th}$ International Conference on Computational Science and Engineering (CSE), pp. 640-647, Dec. 2012.

F. Erden, A.Z. Alkar, A.E. Cetin, "A robust system for counting people using an infrared sensor and a camera," in Infrared Physics & Technology, vol. 72, pp. 127-134, Sep. 2015.

R.C. Luo, O.Chen, "Wireless and Pyroelectric Sensory Fusion System for Indoor Human/Robot Localization and Monitoring," in IEEE/ASME Transactions on Mechatronics, vol. 18, No. 3, pp. 845-853, Jun. 2013.

H. Kim, K. Ha, S. Lee, K. Lee, "Resident Location-Recognition Algorithm Using a Bayesian Classifier in the PIR Sensor-Based Indoor Location-Aware System," in IEEE Transactions on Systems, Man, and Cybernetics, Part C: Applications and Reviews, vol. 39, No. 2, pp. 240-245, Mar. 2009.

P. Zappi, E. Farella, L. Benini, "Tracking Motion Direction and Distance With Pyroelectric IR Sensors," in IEEE Sensors Journal, vol. 10, No. 9, pp. 1486-1494, Sep. 2010.

J. Yun; M. Song, "Detecting Direction of Movement Using Pyroelectric Infrared Sensors," in IEEE Sensors Journal, vol. 14, No. 5, pp. 1482-1489, May 2014.

J. Fang, Q. Hao, D. J. Brady, B. D. Guenther, and K.Y. Hsu, "Real-time human identification using a pyroelectric infrared detector array and hidden Markov models," in Opt. Express, vol. 14, No. 15, pp. 6643-6658, Jul. 2006.

J. Fang, Q. Hao, D. J. Brady, B. D. Guenther, and K.Y. Hsu, "A pyroelectric infrared biometric system for real-time walker recognition by use of a maximum likelihood principal components estimation (mlpce) method," in Opt. Express, vol. 15, No. 6, pp. 3271-3284, Mar. 2007.

J. Fang, Q. Hao, D. J. Brady, M. Shankar, B.D. Guenther, N.P. Pitsianis, and K.Y. Hsu, "Path-dependent human identification using a pyroelectric infrared sensor and fresnel lens arrays," in Opt. Express, vol. 14, No. 2, pp. 609-624, Jan. 2006.

Q. Hao, D.J. Brady, B.D. Guenther, J.B. Burchett, M. Shankar, S. Feller, "Human Tracking With Wireless Distributed Pyroelectric Sensors," in IEEE Sensors Journal, vol. 6, No. 6, pp. 1683-1696, Dec. 2006.

Q. Sun, F. Hu, Q. Hao, "Mobile Target Scenario Recognition Via Low-Cost Pyroelectric Sensing System: Toward a Context-Enhanced Accurate Identification," in IEEE Transactions on Systems, Man, and Cybernetics: Systems, vol. 44, No. 3, pp. 375-384, Mar. 2014.

R. Ma, Q. Hao, "Buffon's needle model based walker recognition with distributed binary sensor networks," in 2012 IEEE Conference on Multisensor Fusion and Integration for Intelligent Systems (MFI), pp. 120-125, Sep. 2012.

T. Yue, Q. Hao, D.J. Brady, "Distributed binary geometric sensor arrays or low-data-throughput human gait biometrics," in 2012 IEEE 7$^{th}$ Sensor Array and Multichannel Signal Processing Workshop (SAM), pp. 457-460, Jun. 2012.

S. Amari. "Information geometry on hierarchy of probability distributions," in IEEE Trans. on Inform. Theory, vol. 47, No. 5, pp. 1701-1711, Jul. 2001.

M. Lustig, D. Donoho, J.M. Pauly, "Sparse MRI: The application of compressed sensing for rapid MR imaging," in Magnetic Resonance in Medicine, vol. 58, No. 6, pp. 1182-1195, Dec. 2007.

M. F. Duarte, M. A. Davenport, D. Takhar, J. N. Laska, T. Sun, K. F. Kelly, and R. G. Baraniuk, "Single-pixel imaging via compressive sampling," in IEEE Signal Process. Mag., vol. 25, No. 2, pp. 83C91, 2008.

\* cited by examiner

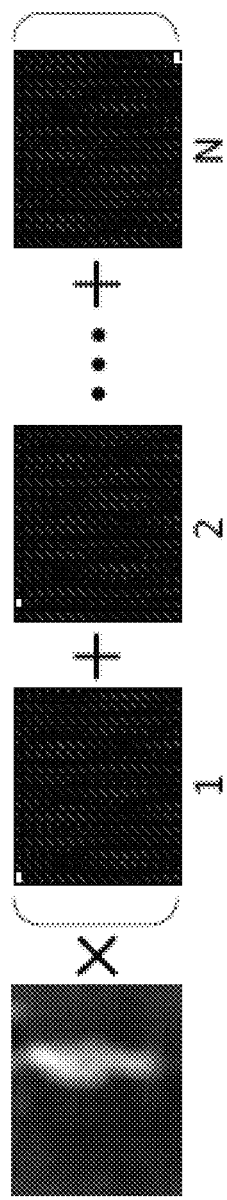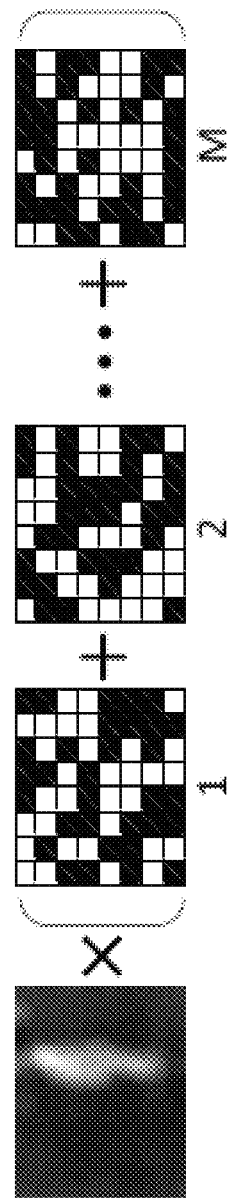

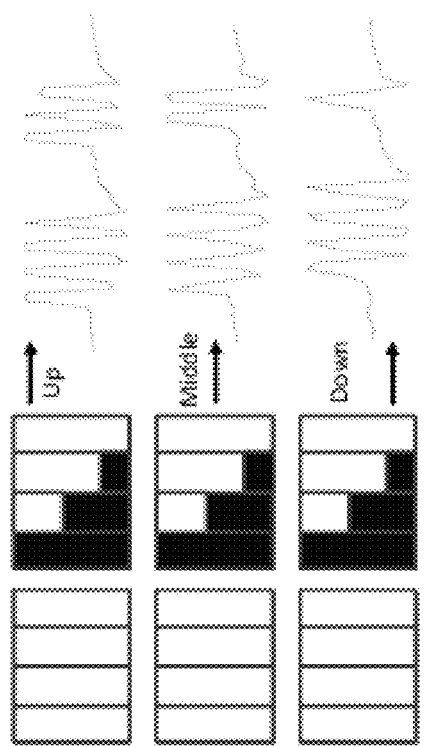
FIG. 19
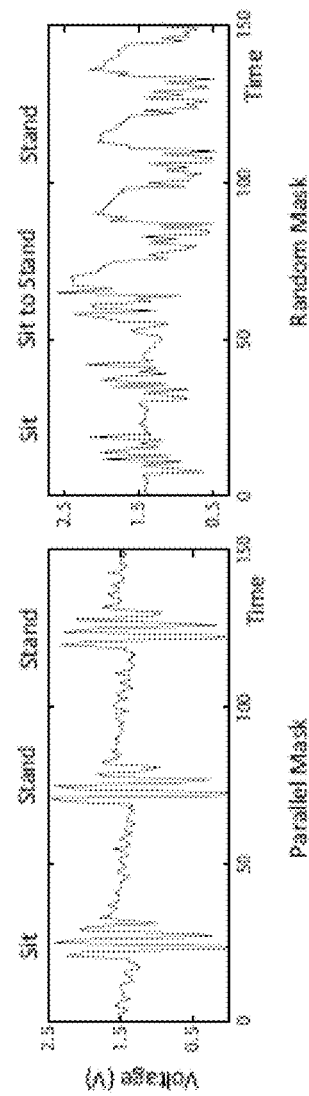
FIG. 20A
FIG. 20B

ACTIVE COMPRESSIVE SENSING VIA A THERMAL SENSOR FOR HUMAN SCENARIO RECOGNITION

CROSS REFERENCE TO RELATED APPLICATION

This application claims priority to and benefit of U.S. Provisional Patent Application Ser. No. 62/349,159 filed Jun. 13, 2016, which is fully incorporated by reference and made a part hereof.

GOVERNMENT SUPPORT CLAUSE

This invention was made with government support under grant IIS-0915862, CNS-1059212, and CNS-1335263 from the U.S. National Science Foundation (NSF). The government has certain rights in the invention.

BACKGROUND

Human scenario recognition systems have attracted attention because of their applications in healthcare, intelligent controls, smart houses, etc. The scenario understanding can be achieved by using the information of locations and motions of the subjects. Generally scenario recognition is different from motion recognition. Motion recognition focuses on the individual's motions, while scenario recognition is more concerned about the context such as the size of the group, locations and postures of human subjects, and the like. The identification of such information for motion recognition does not require very accurate motion capture because the idea is to extract systematic, intrinsic patterns of the motion signals instead of analyzing each action snapshot. In scenario understanding, the targets can be measured at a distance despite the subject's cosmetic conditions. The system can use low-resolution sensory data for accurate context identification, and it can be used for non-cooperative subjects under examination, i.e., the system can be non-intrusive since the subject may be unaware of the deployed sensors nearby.

Regarding human scenario recognition, the video camera is perhaps the most widely used device. However, it consumes large communication bandwidth and storage space, and it can be easily influenced by the illumination and background conditions. For example, it cannot accurately capture the subject that is in dark environment or is hidden behind other objects.

Pyroelectric Infrared (PIR) sensors have been employed for human detection, tracking and identification due to their low cost, tiny hardware, and operation stability under varying temperatures. Existing systems employ a passive PIR sensor that uses dual elements to form a differential measurement, so that it can detect the thermal change of the environment (rather than the absolute temperature). This configuration enables it to detect the moving thermal source, but also limits its application for static targets.

In daily lives, many ordinary scenarios involve static humans. During the process of indoor scenario perception, one or several human subjects may not generate any detectable motions within a certain period. For example, people are sitting for a talk or reading books. Therefore, what is desired are systems, methods and devices that overcome challenges in the art, some of which are described above. In particular, systems, methods and devices that provide thermal detection of static and moving objects are desired.

SUMMARY

Because of the challenges described above, disclosed herein are systems, methods and devices of active thermal sensing. Active thermal sensors can detect the static objects (e.g., human subjects) by moving the sensor, a mask (located between the sensor and the object), or both to actively generate thermal changes. In one embodiment, an active thermal sensor that can be rotated such that it scans the environment and can detect objects. The rotation of the sensor generates thermal changes for the detected object(s).

In another embodiment, a moving multi-mask comprised of one or more small masks rotate around the sensor. Rotation of the mask generates active thermal changes for the detected scene based on compressive sensing theory for human posture recognition.

In yet another embodiment, a sensor with at least one mask can be worn by a user. Active sensing is achieved by movement of the user, which in turn moves the sensor and the mask. This wearable sensor has many applications including, for example, it can be used for the blinded to distinguish between human and non-human thermal sources surrounding them. Active sensors can serve as the extension of the walking stick/cane without interfering with other people. Disabled persons can also utilize this sensing system to assist with their social behaviors, such as avoiding obstacles, perceiving concealed fellows, etc.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 3B illustrates the PIR sensor signals before and after sensor node rotation;

FIGS. 8A and 8B illustrate the sensing procedure of a thermal image using (FIG. 8A) conventional measurement and (FIG. 8B) (b) compressive measurement;

FIG. 19 illustrates results of hot spot test for the rotating multi-mask along different trajectories;

FIGS. 20A and 20B illustrate a comparison between the parallel coded mask and random coded mask, respectively;

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Figure 1:
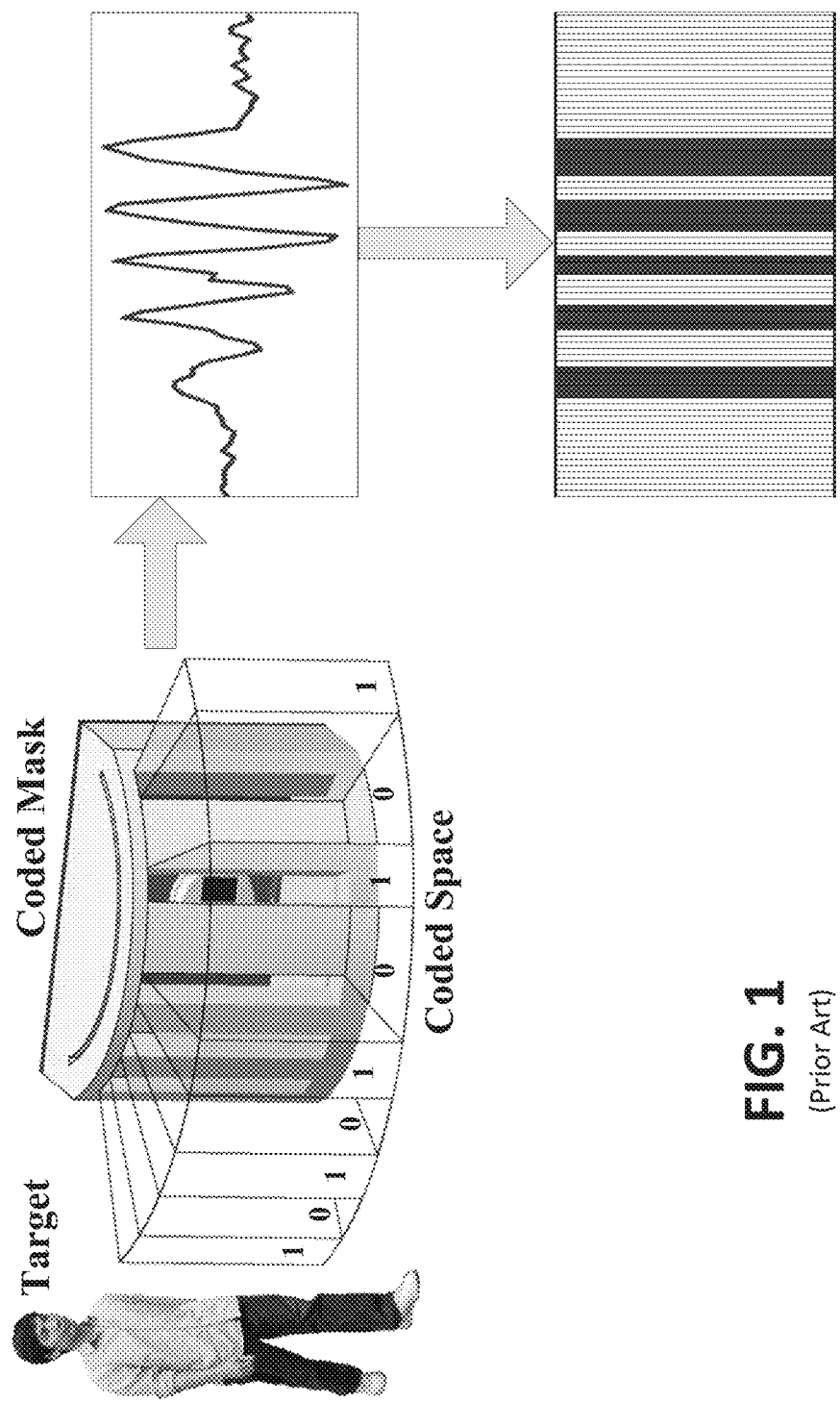
FIG. 1 illustrates a passive, prior art, sensing system for moving thermal source detection.

FIG. 1 illustrates passive, prior art, sensing for moving thermal source detection. Existing systems employ a passive PIR sensor that uses dual elements to form a differential measurement so it can detect the thermal changes of the environment (rather than the absolute temperature). This configuration enables detection of a moving thermal source, but limits its application for static targets.

The data measured by PIR sensors has a sparsity nature due to the similarity among the data samples sensed by the PIR sensor. A traditional equi-spaced sampling method, as shown in FIG. 1, takes an equal number of samples from the sensing space and thus it has poor efficiency in terms of removing the data redundancy during the information acquisition from these compressed analog signals.

Described herein are devices, systems and methods that use binary sensing and pseudo-random sampling in an active thermal sensor design. In binary sensing, the sensor's sensing space, called field of view (FOV), is divided into small regions. If the signal is detected in a region, it means that an object emitting thermal radiation is within or has moved across that region, and the sensor generates a binary signal '1'. Otherwise, it generates '0' for that region. With this method, the binary sensor signal can describe the geometric information of the targets because the target may occupy multiple regions. Binary data also has a stronger resistance to noise than analog data. Because only bits 1 or 0 are used in the sensing results, it reduces the data throughput and communication overheads.

Compared to equi-spaced sampling, a pseudo-random sampling structure based on compressive sensing principle acquires more information of the target and thus has better recognition performance. Based on Buffon's Needle model from integral geometry theory, binary statistic features can be extracted to estimate the target size and achieve the recognition of static human postures. Such geometric information cannot be acquired by analog signals or traditional algorithms.

Disclosed and described herein are designs of an active sensing scheme where the thermal sensor and/or its masks can be periodically rotated to detect static thermal subject (such as a sitting person, sleeping pet, etc.). The thermal sensor and/or the mask can be rotated using, for example, a rotating motor unit. In one aspect, the thermal sensor comprises a wireless PIR thermal sensor and the motor only adds a 2×2×2 inch volume to the PIR wireless sensor board. One aspect of the disclosure comprises pseudo-random sampling based on multi-mask hardware. Compressive sensing principles are used to create a multi-mask lens with a pseudo-random sampling structure. Such a multi-mask can generate rich signal patterns for any thermal target to be detected. Without such a multi-mask, the incoming sensing signals just have simple sinusoidal-like curves without dominant features. Those rich patterns can be used for more accurate scenario recognition. Also disclosed herein is three-dimensional sampling for wearable PIR sensors. For example, a watch-like PIR sensor with 3-D target sensing capabilities is described that can be worn in hand wrist to detect surrounding subjects.

Figure 2:
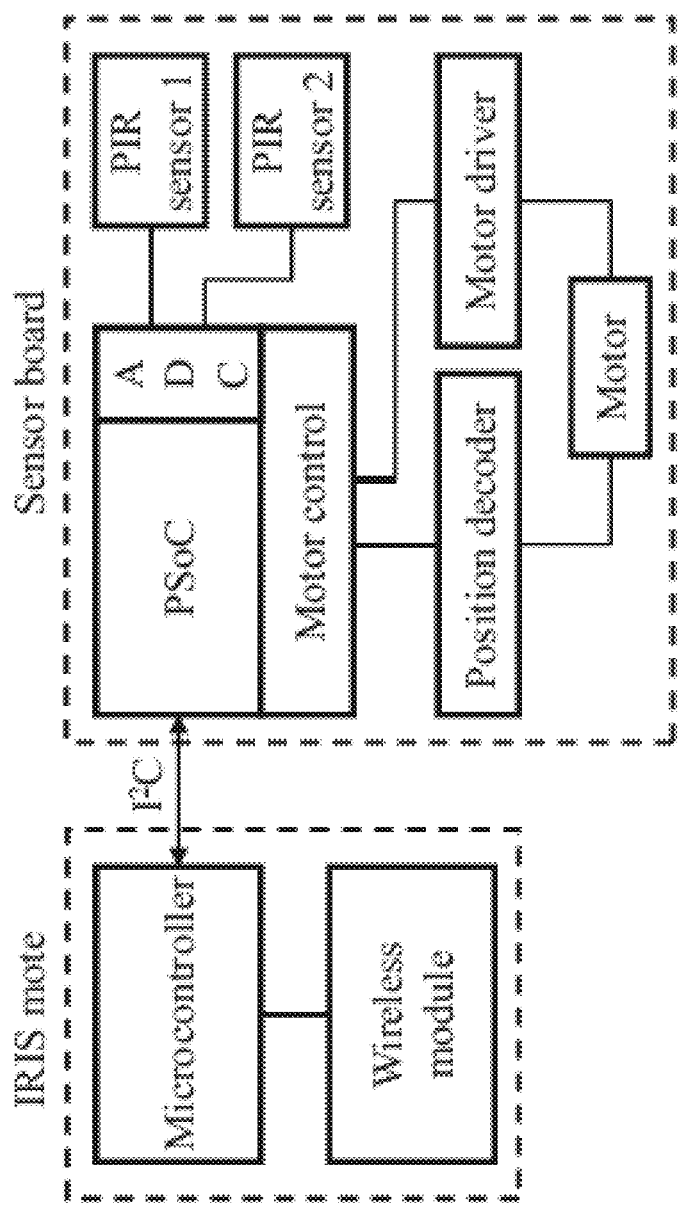
FIG. 2 illustrates an exemplary embodiment of a device for thermal detection of static and moving objects.

FIG. 2 illustrates an exemplary embodiment of a device for thermal detection of static and moving objects. As shown in FIG. 2, in this embodiment the device hardware comprises an IRIS wireless mote and a sensor board. The IRIS mote is used for the signal processing and wireless networking. The sensor board includes a programmable system-on-chip (PSoC), an amplification circuit, and our invented motor drive unit. The PSoC reads the ADC data from the sensor and controls the motor. All the data (sensor signal, amplification gain, rotating angle, etc.) is sent to IRIS mote via PSoC through an I²C protocol for wireless transmission. The hardware architecture of the sensor node is further shown in FIG. 2.

Figure 3B:
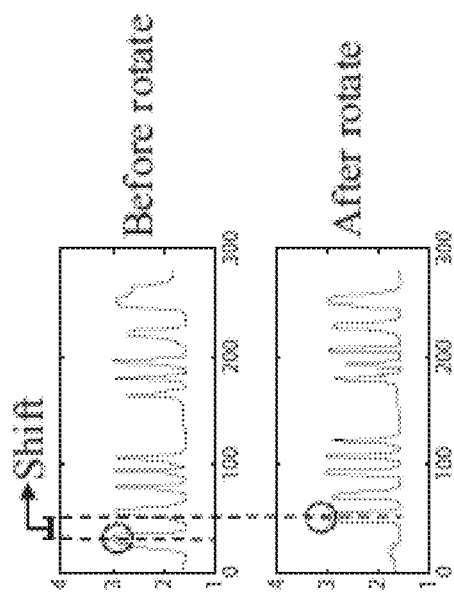
FIGS. 3A and 3B illustrate controlling the sensor's orientation for calibration purpose, as shown in FIG. 3A.
Figure 3A:
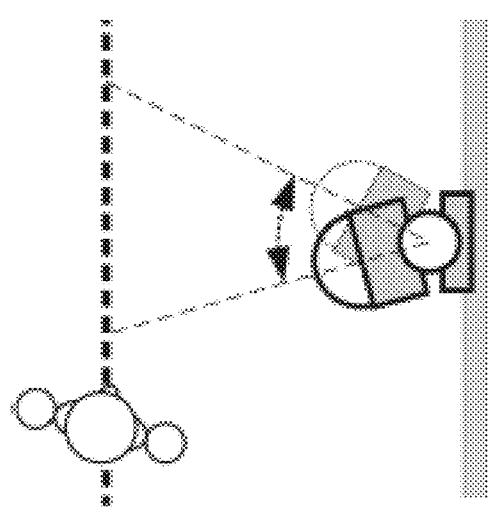

The PSoC adds certain intelligence to the sensor. It can change the amplification gains of the sensor when the target-to-sensor distance is changing. It can also control the sensor's orientation for calibration purpose, as shown in FIG. 3A. In one aspect, the active sensing system includes an angle sensor in the mini motor. The PSoC reads in the angle data and determines how to rotate the sensor or the mask according to the preprogrammed operation modes. FIG. 3B illustrates the PIR sensor signals before and after sensor node rotation.

Binary sensors can achieve highly data-efficient sensing and capture the intrinsic geometric information of the target. Direct use of binary data includes scenario classification. It is also possible to extract the meaning of the binary data in addition to classifying them for scene identification purpose. A physical model can be created that relates the geometric meaning to the binary data, which allows explanation of the generated sensing signals. To recover the geometric target information from the binary data, we start by building the physical model of the human target, such that we can know the size or geometric distribution of the target.

Figure 4B:
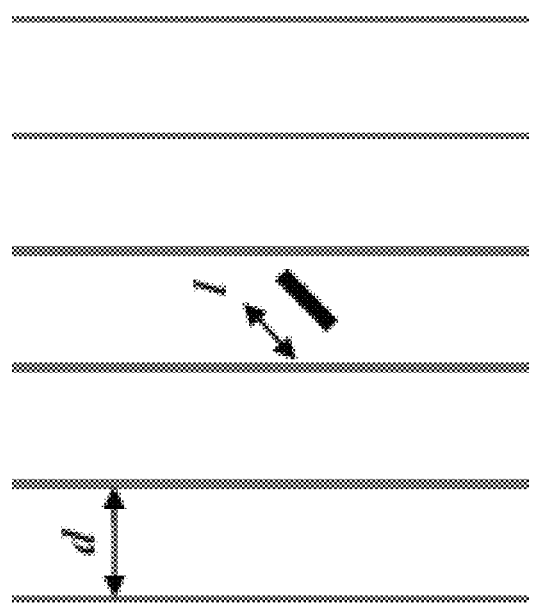
FIGS. 4A and 4B illustrate the sampling structures of parallel lines, and pseudo-random lines, respectively.
Figure 4A:
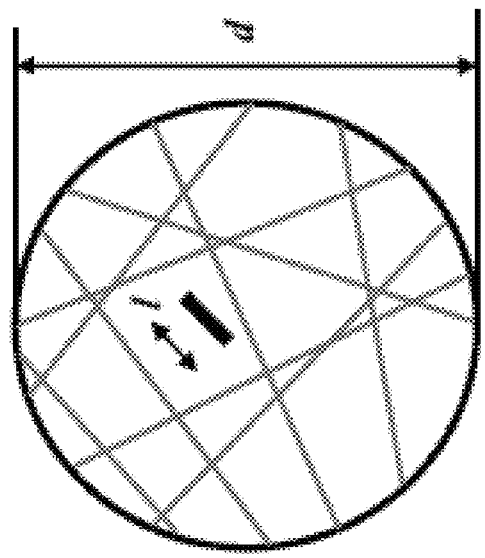

To model the motion of human target, the Buffon's Needle model from the field of integral geometry is utilized, where the human target is modeled as a moving needle in the FOV of sensors. The probability of the target triggering the detection by the sensor can be calculated by the math operation of integration. Two cases are considered here, as shown in FIGS. 4A and 4B. In the first case, the traditional sampling structure of parallel lines are used. The probability of the target touching the parallel lines is given by:

$$p_c = \frac{2l}{\pi d'} \quad (1)$$

where l is the length of the needle, and d is the distance between two lines.

In the second case, the probability of the target touching the pseudo-random lines is given by:

$$p_{rc} = 1 - (1 - 2l/\pi d)^N \quad (2)$$

where d is the diameter of the circle, and N is the number of the lines in the area. The probability of target triggering the sensor is the probability of having '1' in the generated sensory data. Buffon's Needle model thus can establish the relation between the geometric information and the binary sensor data.

Figure 5:
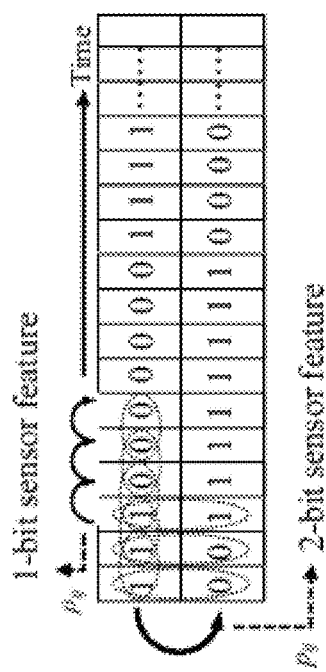
FIG. 5 illustrates the statistical features of binary sensors.

The statistics of binary data can represent the static and dynamic features of the target. However, a target usually has a non-Euclidean geometric structure, which means that the general statistic features are not independent. The statistical features have been extracted from the binary sensor's data streams, as shown in FIG. 5. For the 1-bit PIR sensory data stream, two features can be generated: (1) temporal correlation θ, and (2) intersection probability or marginal density η. They have the following relationship:

$$\eta = \frac{\rho_{10} + \rho_{01}}{2} + \rho_{11} \quad (3)$$

$$\theta = \log\left(\frac{\rho_{00}\rho_{11}}{\rho_{01}\rho_{10}}\right)$$

where $[\rho_{00}, \rho_{01}, \rho_{10}, \rho_{11}]$ are the joint probabilities of each group of two consecutive bits in a binary data stream.

For a 2-bit PIR sensory data stream, the third feature, spatial correlation $\theta_{12}$, can be calculated as:

$$\theta_{12} = \log\left(\frac{\rho_{00}\rho_{11}}{\rho_{01}\rho_{10}}\right) \quad (4)$$

where $[\rho_{00}, \rho_{01}, \rho_{10}, \rho_{11}]$ are the joint probabilities of the two sensors on the same node.

Those three statistical features are orthogonal to each other, and they can be obtained from the decomposition of a higher-order Markov chain. They can be used for the scenario recognition. For the passive PIR sensors, the temporal correlation is related to the temporal transition of the thermal source; the marginal density is related to the size of thermal sources; and the spatial correlation is related to the spatial distribution of the thermal source. In the disclosed active thermal sensing scheme, the physical meaning of temporal correlation is represented as the thermal transition of the target under different sensor FOVs.

A multi-mask lens for the PIR sensor is described that is based on the compressive sensing/sampling principle. Such a multi-mask lens plays an important role in sensing process the lens' architecture can generate rich sensing patterns.

Without the multi-mask, the sensor just generates a simple, smooth analog signal curve. Below is a brief introduction to the math model of the compressive sampling. In general, a signal measurement process can be represented as:

$$s = \Phi x \quad (5)$$

where s is the measurement data matrix $\in R^{M \times 1}$, $\Phi$ is the sensing system coefficient matrix $\in R^{M \times N}$, and x is the original (raw) signal $\in R^{N \times 1}$. In conventional sensing, $\Phi$ is a strict diagonally dominant matrix or diagonal matrix, and it has M≤N. In compressive sensing, the sparse signal can be measured at a much lower sampling rate than the traditional Nyquist rate by using random sampling technique. Here P is a random matrix and it could be M<<N. For compressive sensing, the random sampling is an important mechanism that guarantees the success of signal reconstruction.

Figure 6B:
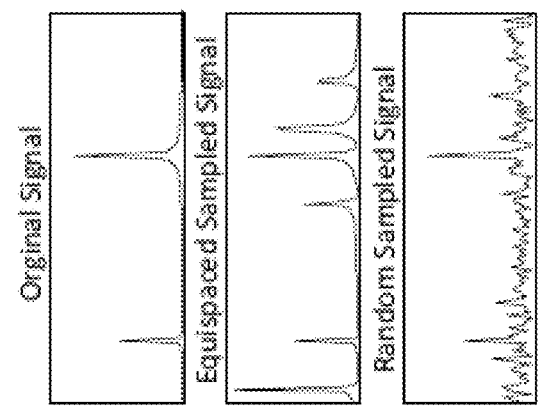
FIGS. 6A and 6B illustrate an example of compressive sampling, it can be seen in FIGS. 6A and 6B that the equi-spaced sampled signal has heavy aliasing distortion in the frequency domain, while the random sampled signal has the white noise and reserves the major frequency components.
Figure 6A:
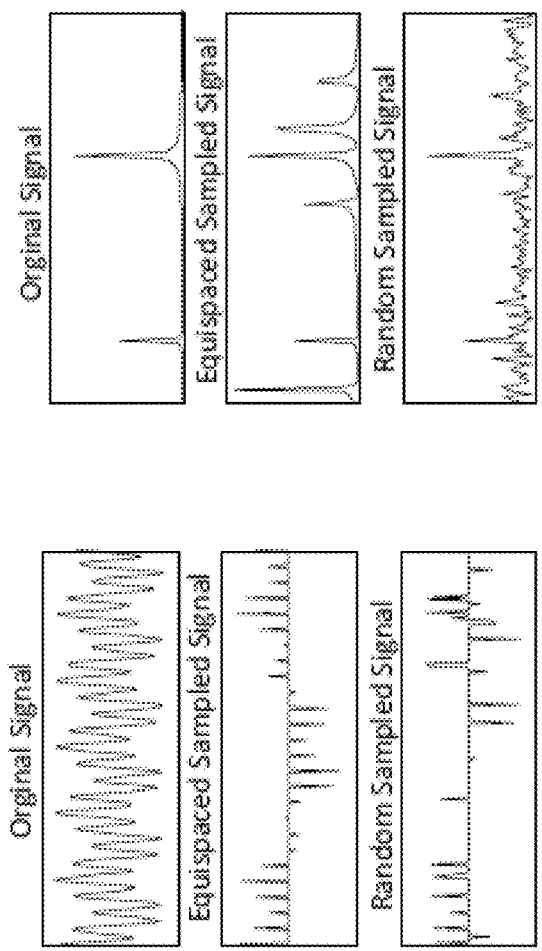

An example of compressive sampling is shown in FIG. 6. The original signal is re-sampled with both equi-spaced sampling and random sampling. The re-sampled signals are 10-fold under-sampled. It can be seen in FIGS. 6A and 6B that the equi-spaced sampled signal has heavy aliasing distortion in the frequency domain, while the random sampled signal has the white noise and reserves the major frequency components.

The human scenario signals can be treated as sparse signals in a thermal distribution space. The human postures can be modeled as a set of moving sticks, and has much less intrinsic degree-of-freedom than the mega pixels of video signals. This makes the scenario recognition easy to achieve via the PIR sensors. The compressive sensing indicates that random sampling can better preserve the main features of the target. Thus, pseudo-random sampling design is applied for the disclosed thermal sensors: for a thermal sensor with a rotating mask, multiple random coded masks can be used. For a wearable thermal sensor: 3-dimensional (3D) random sampling with arm movement can be used. The efficiency of these random sampling designs is verified in the experimental results described herein.

Described herein are three active sensing implementations for thermal detection of static and moving objects: (1) a moving/rotating sensor, (2) a sensor with a moving/rotating multi-mask, and (3) a wearable sensor. It is to be appreciated that the disclosed systems can complement each other to form a more powerful sensing system. For example, the rotating sensor and multi-mask sensor embodiments can be integrated in one system to achieve active, compressive sampling. Similarly, the wearable sensor can include a moving sensor and/or multi-mask.

A. Rotating Sensor

In one embodiment, a device for thermal detection of static and moving objects comprises a thermal sensor; and at least one mask in proximity to the sensor, wherein movement of at least one of the at least one mask and the thermal sensor causes the thermal sensor to create an active compressive sampling signal, wherein the thermal sensor is stationary and the at least one mask moves relative to the stationary thermal sensor.

Figure 7:
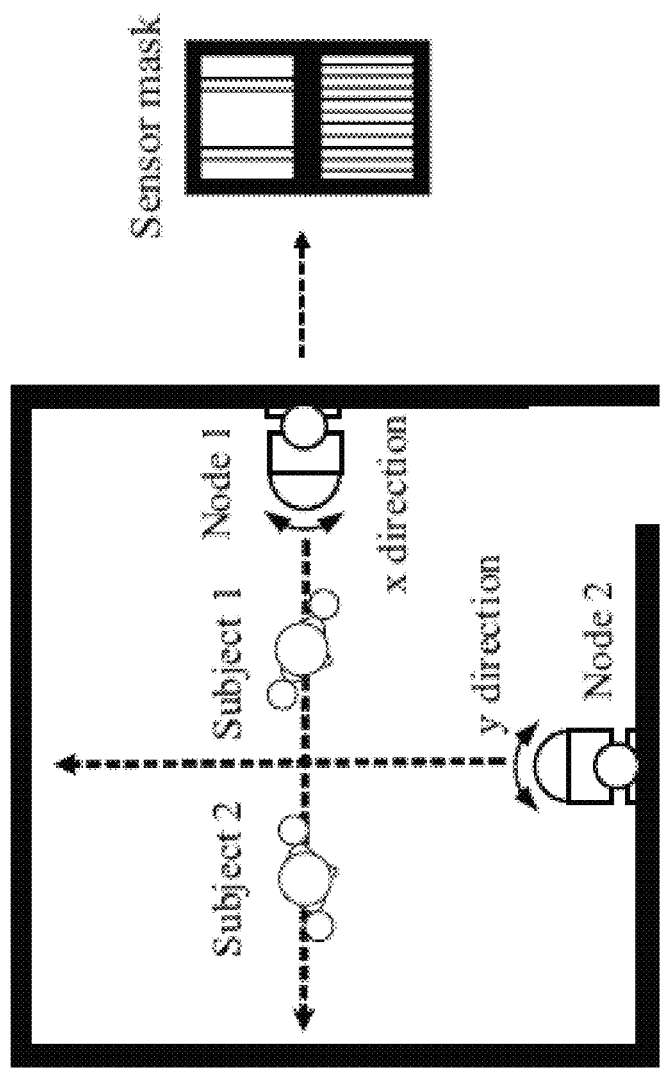
FIG. 7 illustrates a human scenario scanning implementation of one of the embodiments of the present invention.

For example, the thermal sensor may comprise a PIR sensor and PIR sensor can be rotated by a mini motor. In one aspect, the device may comprise two thermal sensors, which are assembled above the motor. There may be an angle sensor in the motor that sends back the angle information to a sensor node comprising a processor (e.g. a PSoC), such that the PSoC knows how much the sensor has rotated and determines how much more to rotate next. At least two sensor nodes may be required to count the number of people by scanning the room. For example, a single node may not be able to achieve that when the subjects are standing in line with the node, as shown in the illustrated human scenario scanning implementation of FIG. 7. In FIG. 7, the number of people is counted as one for Node 1 and two for Node 2. When more sensor nodes are used together, ambiguous situations can be identified more accurately. In this sensor design, the mask of the sensor may use a parallel line sampling structure, as shown in FIG. 7.

B. Sensor with Multi-Mask

In another embodiment, a device for thermal detection of static and moving objects comprises a thermal sensor; and at least one mask in proximity to the sensor, wherein movement of at least one of the at least one mask and the thermal sensor causes the thermal sensor to create an active compressive sampling signal, wherein the at least one mask is caused to rotate around or move between the thermal sensor and the object. In one aspect, the at least one mask is moved by a self-controlled servo motor.

With limited number of PIR sensors, enough information may not be obtainable for accurate human posture recognition. Increasing the number of sensors with different masks is an approach to extracting more comprehensive target information. However, the deployment of many sensors is inconvenient and possibly expensive. Compressive sensing provides a solution. The compressive sensing of thermal images with just one pixel is demonstrated in M. F. Duarte, M. A. Davenport, D. Takhar, J. N. Laska, T. Sun, K. F. Kelly, and R. G. Baraniuk, "Single-pixel imaging via compressive sampling," in IEEE Signal Process. Mag., vol. 25, no. 2, pp. 83C91, 2008, which is fully incorporated by reference. A comparison between conventional sensing and compressive sensing of a thermal image is shown in FIGS. 8A and 8B. In conventional sensing, as shown in FIG. 8A, the target is measured with N measurements, and each measurement captures a small part of the target. While in compressive sensing, as shown in FIG. 8B, the target is measured with M measurements, and each measurement is a sum of the whole target. The underlying theory of compressive sensing is that such measurement can reconstruct the target even when $M \ll N$.

A PIR sensor can measure the overall thermal change in the FOV, and is a good candidate for use in compressive sensing. In one aspect, a disclosed PIR sensor uses a PSoC-controlled servo to change the mask of the sensor, such that one sensor can measure the target with different masks, in order to obtain different measurements based on the principle of compressive sensing. Without the need of reconstructing the entire human target shape, the disclosed design can use just one PIR sensor to detect the shape features of the target.

Figure 9:
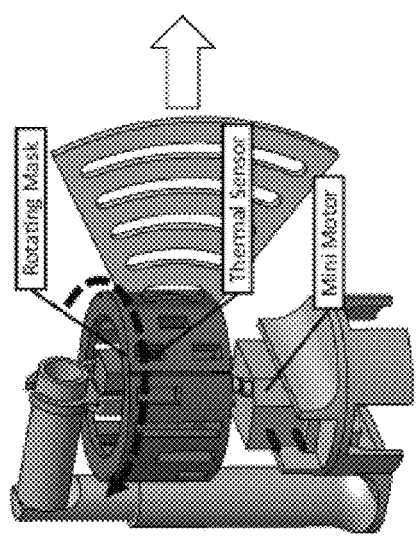
FIG. 9 illustrates one embodiment of a proposed PIR sensor with a rotating multi-mask.
Figure 10:
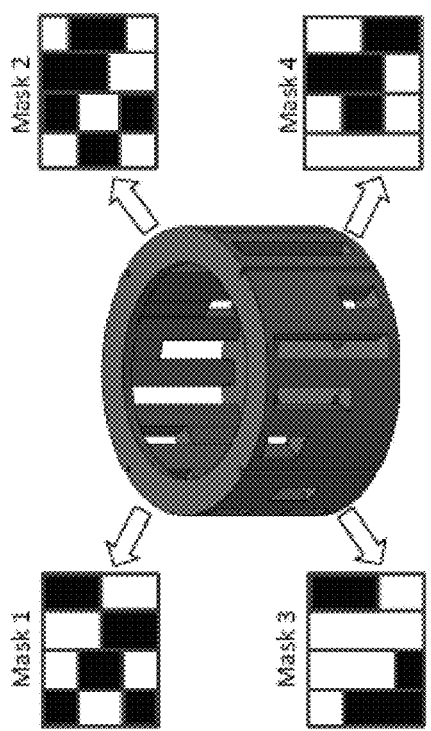
FIG. 10 illustrates an exemplary pseudo-random coded multi-mask design.

One embodiment of a proposed PIR sensor is shown in FIG. 9. This embodiment has a reconfigurable multi-mask set. This multi-mask set actually has four different masks which can be applied to the sensor when it rotates, though more or fewer masks may also be used. These masks divide the FOV of the sensor into 4×3 areas, as shown in FIG. 10. Sensitivity of the thermal sensor can be used to determine the resolution of the mask—high sensitivity equals higher resolution. For a low-cost design, a lower sensitivity sensor can be used with a lower resolution mask.

Figure 11:
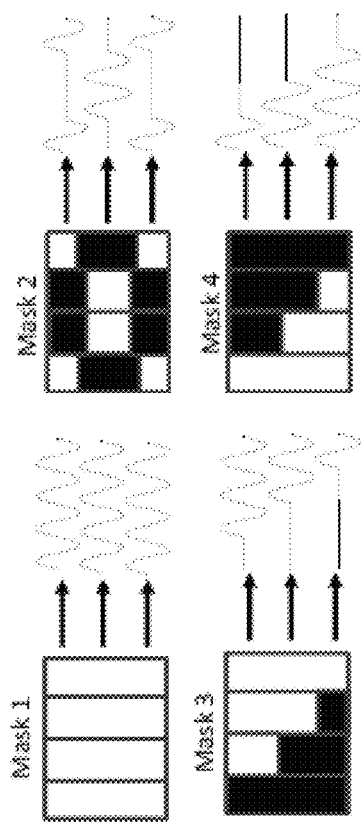
FIG. 11 is an illustration showing that different mask architectures can generate different measurements for the same target, and the same mask architecture may also generate different signals for various targets.

Different mask architectures can generate different measurements for the same target, and the same mask architecture may also generate different signals for various targets, as shown in FIG. 11. In FIG. 11, the thermal target moving along "up, middle and down" directions can make the multi-task sensor generate different numbers of wave peaks. Thus the shape of the target can be measured after one round of mask rotation based on the signals detected by the four masks.

C. Wearable Sensing for Situation Perception

Yet another embodiment of a device for thermal detection of static and moving objects comprises a thermal sensor; and at least one mask in proximity to the sensor, wherein movement of at least one of the at least one mask and the thermal sensor causes the thermal sensor to create an active compressive sampling signal. In this embodiment the at least one mask and the thermal sensor are stationary relative to one another and the at least one mask and the thermal sensor are both moved simultaneously to cause the thermal sensor to create the active compressive sampling signal. For example, the device can be worn on a user and movement of the user causes simultaneous movement of the mask and the thermal sensor resulting in the thermal sensor creating the compressive sampling signal.

Figure 12:
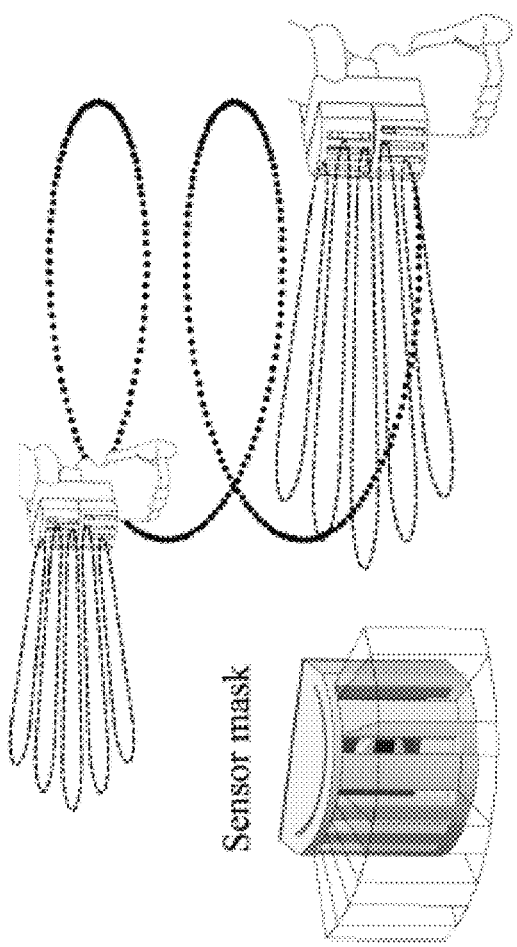
FIG. 12 is an illustration of a wearable embodiment of a sensor utilizing random three-dimensional sampling.

The wearable sensor can be useful for sight-impaired people to detect other people around them. The sensor node uses similar hardware units as the sensor with servo control but without a motor. In one aspect, it is designed to fit the hand and/or wrist. It can be tied with a cell phone armband, as shown in FIG. 12. Its mask may use a parallel sampling structure, and a pseudo-random sampling can be actually generated from the random arm movements. As long as the sensor moves just a little bit, (which happens each time the person walks or just slightly swings the arm), the sensor is able to generate the detection signals. The sight-impaired can use this wearable embodiment to perceive the situations of surrounding human subjects.

During the measurement process, the user's arm swings a little to detect the static targets. In order to achieve better recognition rate and to alleviate the impacts from different target distances and orientations, pseudorandom 3-dimensional (3D) sampling can be sued. In this sampling, the sensor is swung left and right, up and down, back and forth randomly, such that it could sample more information of the target, and meanwhile it is insensitive to target distance and orientation in a certain scope. Such random sampling structure can be represented by Buffon's Needle model, as already described herein and shown in FIGS. 4A and 4B.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 13:
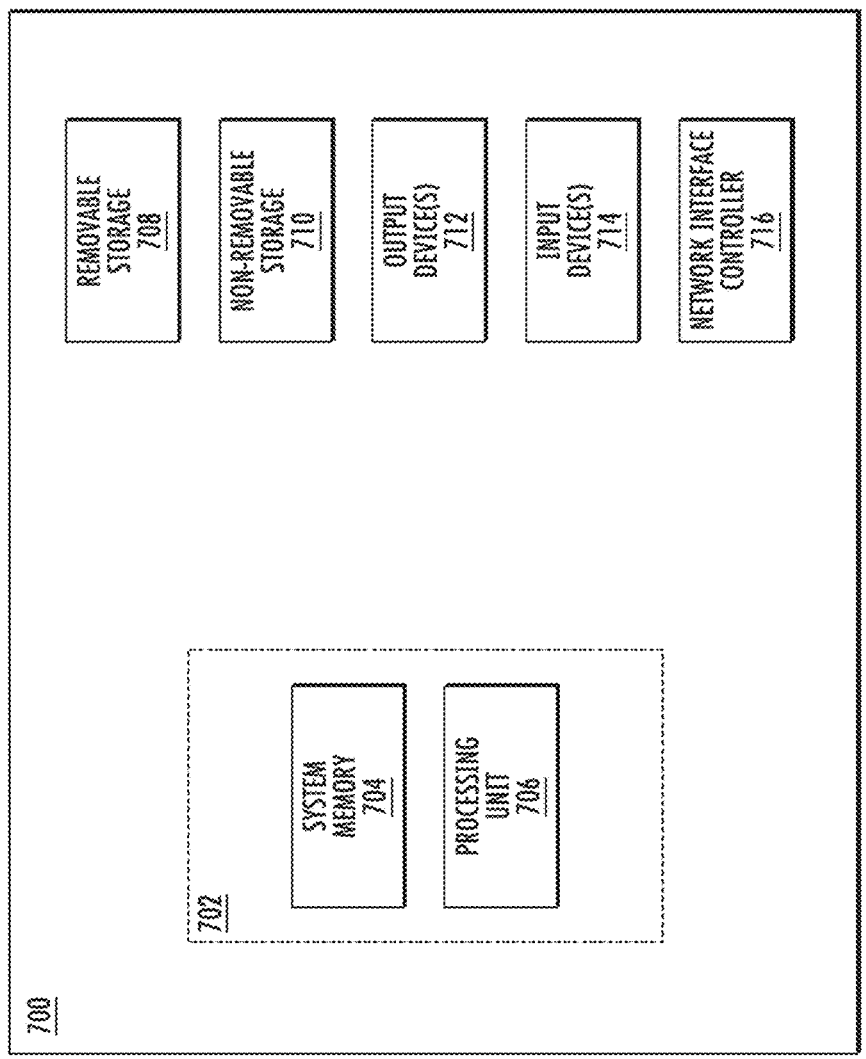
FIG. 13 is a block diagram of an example computing device.

When the logical operations described herein are implemented in software, the process may execute on any type of computing architecture or platform. For example, referring to FIG. 13, an example computing device (e.g., a controller or microcontroller) upon which embodiments of the invention may be implemented is illustrated. The computing device 700 may include a bus or other communication mechanism for communicating information among various components of the computing device 700. In its most basic configuration, computing device 700 typically includes at least one processing unit 706 and system memory 704. Depending on the exact configuration and type of computing device, system memory 704 may be volatile (such as random access memory (RAM)), non-volatile (such as read-only memory (ROM), flash memory, etc.), or some combination of the two. This most basic configuration is illustrated in FIG. 13 by dashed line 702. The processing unit 706 may be a standard programmable processor that performs arithmetic and logic operations necessary for operation of the computing device 700. As used herein, "processor" refers to a physical hardware device that executes encoded instructions for performing functions on inputs and creating outputs.

Computing device 700 may have additional features/functionality. For example, computing device 700 may include additional storage such as removable storage 708 and non-removable storage 710 including, but not limited to, magnetic or optical disks or tapes. Computing device 700 may also contain network connection(s) 716 that allow the device to communicate with other devices. Computing device 700 may also have input device(s) 714 such as a keyboard, mouse, touch screen, etc. Output device(s) 712 such as a display, speakers, printer, etc. may also be included. The additional devices may be connected to the bus in order to facilitate communication of data among the components of the computing device 700. All these devices are well known in the art and need not be discussed at length here.

The processing unit 706 may be configured to execute program code encoded in tangible, computer-readable media. Computer-readable media refers to any media that is capable of providing data that causes the computing device 700 (i.e., a machine) to operate in a particular fashion. Various computer-readable media may be utilized to provide instructions to the processing unit 706 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 706 may execute program code stored in the system memory 704. For example, the bus may carry data to the system memory 704, from which the processing unit 706 receives and executes instructions. The data received by the system memory 704 may optionally be stored on the removable storage 708 or the non-removable storage 710 before or after execution by the processing unit 706.

Computing device 700 typically includes a variety of computer-readable media. Computer-readable media can be any available media that can be accessed by device 700 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 704, removable storage 708, and non-removable storage 710 are all examples of computer storage media. Computer storage media include, but are not limited to, RAM, ROM, electrically erasable program read-only memory (EE- PROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process.

Figure 14:
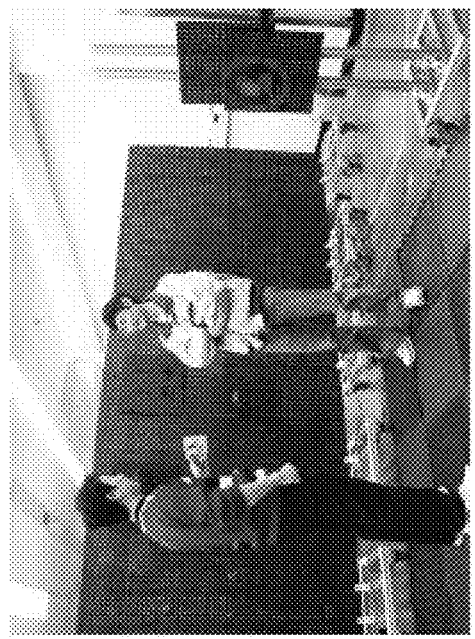
FIG. 14 is an image illustrating an experiment setup for a human detection scenario.

The experiment setup for the human detection scenario is shown in FIG. 14. One person or two people standing in different positions are tested in the experiment with active PIR sensors. Exemplary designed and fabricated active PIR sensor nodes and the sensor board with servo control are shown in FIGS. 15A-15E.

Figures 15A, 15B, 15C, 15D, 15E:
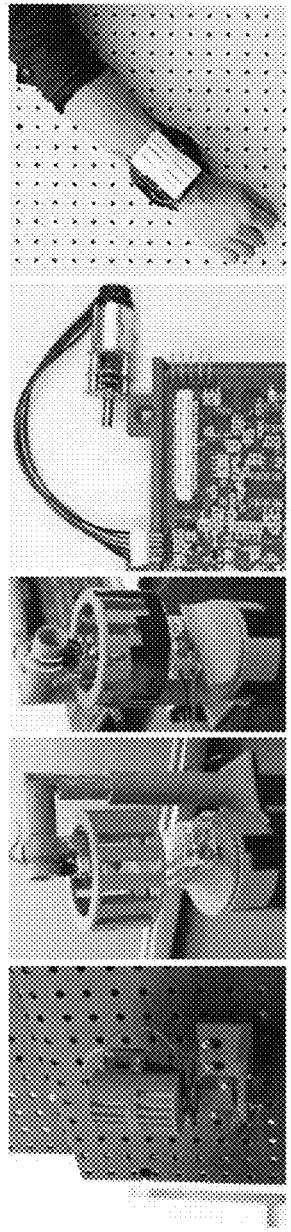
FIGS. 15A-15E illustrate exemplary designed and fabricated active PIR sensor nodes and the sensor board with servo control.
Figure 16:
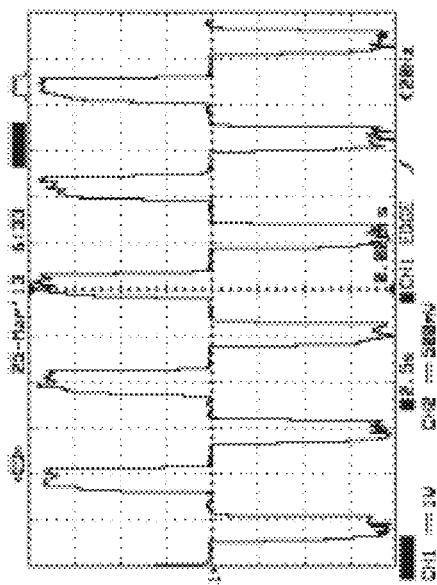
FIG. 16 illustrates an example of a control circuit's voltage output for the motor.

In the first sensor design of FIG. 15A (with the rotating thermal sensor), the sensor board generates the logic signal "0 0", "1 0" and "0 1" to control the motor for stopping, rotating forward and backward operations. The control circuit's voltage output for the motor is shown in FIG. 16. This output drives the motor to rotate back and forth to scan the targets nearby.

Figure 17:
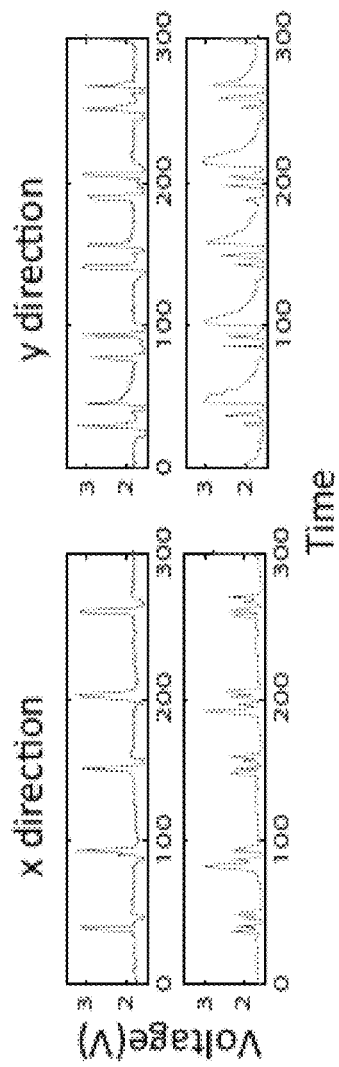
FIG. 17 illustrates signals of two PIR thermal sensor nodes in two direction of scanning two static human subjects.
Figure 18:
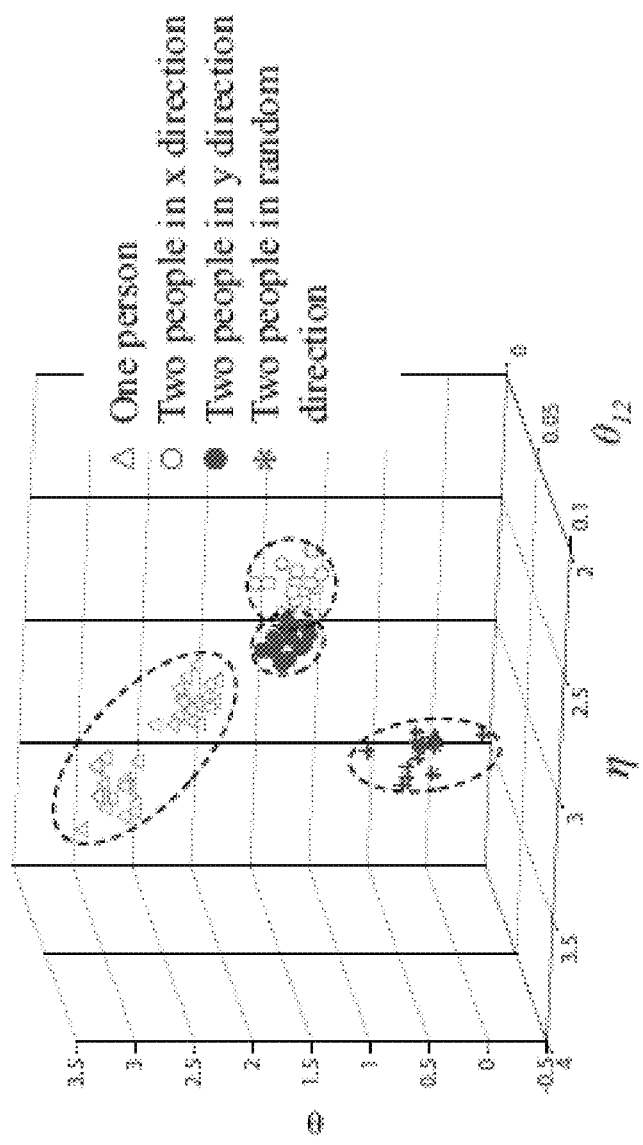
FIG. 18 illustrates scanning results of counting people represented in a feature space.

When two people are standing in a line with one of the sensors, the sensor signal is shown in FIG. 17. The sensor mask can help to distinguish the signals from different numbers of people. FIG. 8 shows the result of scenario recognition. The statistical feature of the target counting is shown in the feature space, as illustrated by FIG. 18. It can be seen that the scenario of one person has a higher temporal correlation $\theta$, since one person has a simpler shape and the sensed signals are more correlated with each other during the process of scanning the room.

In an example involving an embodiment comprising a sensor with a rotation multi-mask (see FIGS. 15B, 15C and 15D (PSoC board with servo-motor control)), a hot soldering iron is used to test the impulse response of the PIR sensor with a rotating mask. The detected signal is shown in FIG. 19. The hot soldering iron stays in different locations to generate various signals. This result verifies the functions of active sensing with rotating mask. In the next experiment, the PIR sensor with a rotating mask is used to detect the static target's postures, such that the system can infer whether the target is reading books or sleeping, etc. A comparison between the parallel coded mask and random coded mask is given in FIGS. 20A and 20B. It can be seen that for parallel coded mask (FIG. 20A), different postures generate the same signal. Thus they cannot be distinguished from each other. However, for the case of pseudo-random coded mask (already shown in FIG. 10), the sitting posture can be easily distinguished from the standing posture, even just using the raw signal. This can be seen from FIG. 20B.

Figure 21:
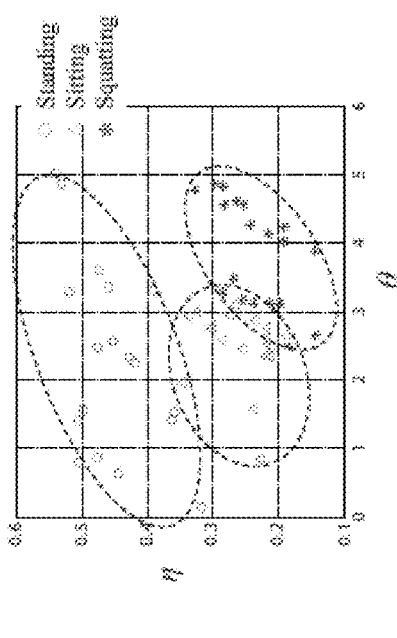
FIG. 21 illustrates human posture recognition by an active sensor with a rotating mask.

The comparison between different gesture recognition results is shown in FIG. 21. The recognition of three basic postures is tested: standing, sitting and squatting. Two statistical features $\theta$ and $\eta$ are used for the recognition because only 1-bit binary stream is generated from the PIR sensor with the rotating mask.

It can be seen from FIG. 21 that from standing to squatting, the $\eta$'s value, which represents the overall size of the target, decreases obviously because the actual target size decreases from the standing, sitting to squatting posture.

The $\theta$'s value represents the target shape correlation. It can be seen that the standing posture has a larger $\theta$ variance but the global distribution of $\theta$ is smaller than the squatting gesture. The $\theta$ of the sitting posture is obviously smaller than squatting, which again proves that the target with the smaller shape has a larger shape correlation $\theta$.

In summary, the statistical features $\theta$ and $\eta$ are able to represent the geometric information of the targets.

In an example involving an embodiment comprising a sensor with a wearable device for thermal detection of static and moving objects (see FIG. 15E), an environment setting may comprise both human and non-human thermal sources. It may be desirous to distinguish the non-human thermal source from human sources. In this experiment, the thermal features of TV screen, computer screen, standing or sitting human subjects are extracted through a wearable PIR sensor node design.

Figure 22:
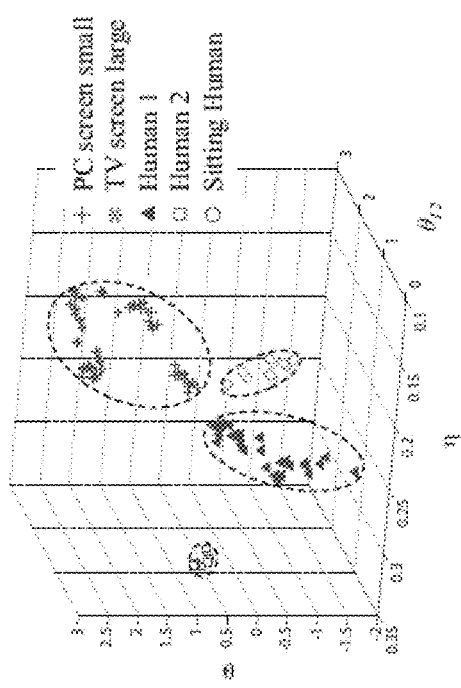
FIG. 22 illustrates wearable sensor results of human and non-human thermal source.

The recognition results of different thermal sources detected by the wearable sensor are shown in FIG. 22. In this example, the wearable sensor node has two PIR sensors and outputs 2-bit binary data. Thus three statistical features $\theta$, $\eta$ and $\theta_{12}$ are used. The non-human thermal sources such as the TV screen (40") and PC screen (21.5"), all have a larger width than the human thermal sources. Thus they have larger $\eta$. And their shapes are also simpler than human body. Thus they also have a higher shape correlation θ than humans. $\theta_{12}$ is the shape correlation in another dimension, and the non-human thermal sources have a larger $\theta_{12}$ due to their simpler shapes. The clusters of different thermal sources can be better distinguished in 3D feature space than in 2D space.

Figures 23A, 23B:
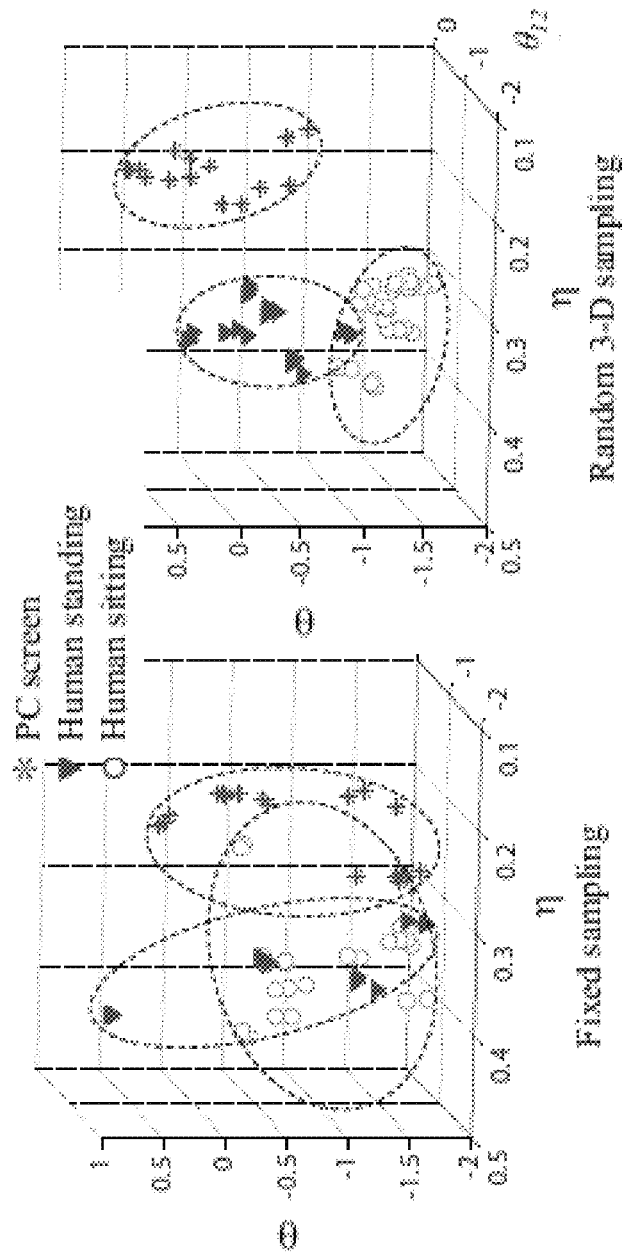
FIGS. 23A and 23B illustrate a comparison of fixed sampling results and 3-D random sampling results.

The experiment for testing different sampling methods is also performed, and the results are shown in FIGS. 23A and 23B. It can be seen that the features of different thermal sources may not be easily distinguished from each other when the signal is collected by swinging the arm along a fixed path. This is because that the sampling method performed along the fixed path is not invariant with respect to the thermal source location and orientation.

By comparison, the 3D random sampling method is insensitive to the locations and orientations of thermal sources and different users. Different thermal targets can be better recognized in the feature space. The geometric information represented by the three statistical features θ, η and $\theta_{12}$ accords well with the practical truth.

Figure 24:
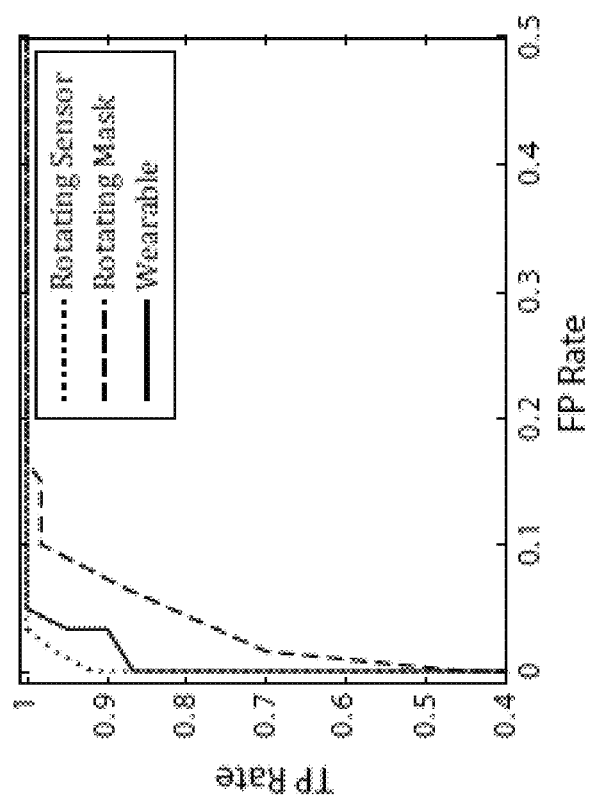
FIG. 24 illustrates a receiver operating characteristics (ROC) curve of recognition performance of the three active PIR sensing systems.

The recognition of different scenario contexts including different number of people, different thermal sources or different human postures, can be easily achieved by using the above statistic features. Here the recognition performance for the sensor designs is compared. The recognition performance of the three proposed active PIR sensor designs, in the form of receiver operating characteristic (ROC), is shown in FIG. 24. It can be seen that the rotating sensor has the best performance, because it uses two nodes with four sensors, and the signal from different numbers of people is quite different from each other. The sensor with rotating multi-mask has the worst performance among the three designs because it uses the fewest sensors: only one sensor is used to achieve the posture recognition. But its performance is still good enough with 92% true-positive (TP) rate at 7% false-positive (FP) rate.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A device for thermal detection of static and moving objects comprising:
   a thermal sensor; and
   at least one mask in proximity to the sensor, wherein movement of at least one of the at least one mask and the thermal sensor causes the thermal sensor to create an active compressive sampling signal and wherein the at least one mask and the thermal sensor are stationary relative to one another and the at least one mask and the thermal sensor are both moved simultaneously to cause the thermal sensor to create the active compressive sampling signal.

2. The device of claim 1, wherein the thermal sensor is stationary and the at least one mask moves relative to the stationary thermal sensor.

3. The device of claim 2, wherein the at least one mask rotates around the stationary thermal sensor.

4. The device of claim 3, wherein the at least one mask is caused to rotate around the stationary thermal sensor by a self-controlled servo motor.

5. The device of claim 1, wherein the at least one mask is stationary and the thermal sensor moves relative to the stationary at least one mask.

6. The device of claim 1, wherein the device is worn on a user and movement of the user causes simultaneous movement of the mask and the thermal sensor resulting in the thermal sensor creating the compressive sampling signal.

7. The device of claim 6, wherein the device is worn on the user's wrist.

8. The device of claim 1, wherein the active compressive sampling signal is created using a pseudo-random three-dimensional (3D) sampling method.

9. The device of claim 1, wherein the at least one mask comprises at least four masks.

10. The device of claim 1, wherein the thermal sensor comprises a pyroelectric infrared (PIR) sensor.

11. The device of claim 1, further comprising a processor, wherein the processor receives the active compressive sampling signal from the thermal sensor and executes computer-readable instructions that identifies a subject within a field of view of the sensor.

12. The device of claim 11, wherein the identified subject is stationary or wherein the identified subject is moving.

13. The device of claim 11, wherein the subject comprises a human and the human is identified as standing, couching or sitting.

14. A method of thermal detection of static and moving objects comprising:
   providing a thermal sensor; and
   providing at least one mask in proximity to the sensor; and
   creating an active compressive sampling signal by moving at least one of the at least one mask and the thermal sensor, wherein the at least one mask and the thermal sensor are stationary relative to one another and the at least one mask and the thermal sensor are both moved simultaneously to cause the thermal sensor to create the active compressive sampling signal.

15. The method of claim 14, wherein the thermal sensor is stationary and the at least one mask moves relative to the stationary thermal senor.

16. The method of claim 15, wherein the at least one mask rotates around the stationary thermal sensor.

17. The method of claim 16, wherein the at least one mask is caused to rotate around the stationary thermal sensor by a self-controlled servo motor.

18. The method of claim 14, wherein the at least one mask is stationary and the thermal sensor moves relative to the stationary at least one mask.

19. The method of claim 14, wherein the device is worn on a user and movement of the user causes simultaneous movement of the mask and the thermal sensor resulting in the thermal sensor creating the compressive sampling signal.

20. The method of claim 14, wherein the active compressive sampling signal is created using a pseudo-random three-dimensional (3D) sampling method.

21. The method of claim 19, wherein the device is worn on the user's wrist.

22. The method of claim 14, wherein the at least one mask comprises at least four masks.

23. The method of claim 14, wherein the thermal sensor comprises a pyroelectric infrared (PIR) sensor.

24. The method of claim 14, wherein the active compressive sampling signal from the thermal sensor is used to identify a subject within a field of view of the sensor.

25. The method of claim 24, wherein the identified subject is stationary or wherein the identified subject is moving.

26. The method of claim 24, wherein the subject comprises a human and the human is identified as standing, couching or sitting.

* * * * *